United States Patent [19]

Pryor et al.

[11] Patent Number: 5,492,769
[45] Date of Patent: Feb. 20, 1996

[54] METHOD FOR THE PRODUCTION OF SCRATCH RESISTANCE ARTICLES AND THE SCRATCH RESISTANCE ARTICLES SO PRODUCED

[75] Inventors: Roger W. Pryor, Bloomfield Township, Mich.; Antony B. Brennan, Gainesville, Fla.; James H. Adair, Gainesville, Fla.; Rajiv K. Singh, Gainesville, Fla.

[73] Assignee: Board of Governors of Wayne State University, Detroit, Mich.

[21] Appl. No.: 948,354

[22] Filed: Sep. 17, 1992

[51] Int. Cl.$^6$ ........................................ B22F 3/00
[52] U.S. Cl. ............................................. 428/552
[58] Field of Search ................................. 428/552

[56] References Cited

U.S. PATENT DOCUMENTS

| | | | |
|---|---|---|---|
| 3,876,450 | 4/1975 | Tanner | 117/54 |
| 3,900,639 | 8/1975 | Lauterbach | 427/34 |
| 3,914,471 | 10/1975 | Cobb et al. | 427/250 |
| 4,123,588 | 10/1978 | Molari, Jr. | 428/412 |
| 4,218,508 | 8/1980 | Humphrey, Jr. | 428/331 |
| 4,239,798 | 12/1980 | Schroeter et al. | 428/331 |
| 4,322,476 | 3/1982 | Molari, Jr. | 428/412 |
| 4,382,109 | 5/1983 | Olson et al. | 428/331 |
| 4,474,857 | 10/1984 | Vaughn, Jr. | 428/446 |
| 4,478,876 | 10/1984 | Chung | 427/54.1 |
| 4,482,538 | 11/1984 | Davies | 424/61 |
| 4,540,631 | 9/1985 | Boultinghouse | 428/419 |
| 4,606,934 | 8/1986 | Lee et al. | 427/76 |
| 4,877,677 | 10/1989 | Hirochi et al. | 428/216 |
| 4,978,702 | 12/1990 | Yuyama et al. | 524/266 |
| 5,015,523 | 5/1991 | Kawashima et al. | 428/336 |
| 5,021,297 | 6/1991 | Rhue et al. | 428/430 |
| 5,026,597 | 6/1991 | Franz et al. | 428/323 |
| 5,059,485 | 10/1991 | Parr et al. | 428/458 |
| 5,075,135 | 12/1991 | Brandt | 427/180 |
| 5,096,626 | 3/1992 | Takamizawa et al. | 264/1.7 |
| 5,188,876 | 2/1993 | Hensel et al. | 428/76 |
| 5,370,944 | 12/1994 | Omori et al. | 428/565 |

*Primary Examiner*—Peter A. Nelson
*Attorney, Agent, or Firm*—Dykema Gossett

[57] ABSTRACT

A method is provided for improving the scratch or surface wear resistance of substrates by embedding discrete, hard particles within the surface layer of the substrate. Discrete, hard particles are applied to the substrate surface and then embedded within and bonded to the surface layer of the substrate by softening the substrate surface layer by either thermal or solvent means. Suitable substrate materials include thermoplastics, thermoset plastics, polymers, glass, soft metals, and composites. Suitable hard particles include diamond, silicon dioxide, aluminum oxide, cubic boron nitride, boron carbide, silicon carbide, silicon nitride, tantalum carbide, titanium carbide, titanium nitride, tungsten carbide, and zirconia alloys containing at least one phase stabilization additive selected from the group yttrium, hafnium, calcium, magnesium, and cesium. Scratch resistant substrates or articles having discrete, hard particles embedded within the surface layer of the substrate or article are also provided. These substrates or articles essentially have the surface wear characteristics of the hard particles or material embedded within the surface layer. Thus, it is possible to prepare plastic materials or articles having significantly improved scratch or surface wear resistance without significantly increasing the weight or external dimensions of the plastic materials or articles.

9 Claims, 3 Drawing Sheets

METHOD FOR THE PRODUCTION OF SCRATCH RESISTANCE ARTICLES AND THE SCRATCH RESISTANCE ARTICLES SO PRODUCED

FIELD OF THE INVENTION

This invention relates to a method of improving the scratch or surface wear resistance of substrates such as plastics, polymers, glasses, and other relatively soft or softenable materials by embedding discrete, hard particles such as diamond particles within the surface layer of the substrate. Discrete, hard particles are applied to the substrate surface and then embedded within and bonded to the surface layer of the substrate by softening the substrate surface layer by either thermal or solvent means. This invention also relates to scratch resistant substrates or articles having discrete, hard particles embedded within the surface layer of the substrate or article. Substrates or articles prepared by the method of this invention essentially have the surface wear characteristics approaching those of the hard particles or material embedded within the surface layer. Thus it is possible by the method of this invention to prepare plastic materials or articles having significantly improved scratch or surface wear resistance without significantly increasing the weight or external dimensions of the plastic materials or articles. This invention can be used to prepare scratch resistant plastic, polymer, ceramic, glass, metal, and composite substrates or articles.

BACKGROUND OF THE INVENTION

The tendency of plastics, glasses, and other relatively soft materials to be scratched or otherwise marred during normal handling and use has limited the applications of such materials and has limited the useful life of articles prepared from such materials. Scratches on transparent plastic windows or screens can severely limit the useful life of the product and can lead to significant consumer dissatisfaction.

Several techniques have been used to provide scratch resistance to plastic and other relatively soft materials. Such techniques have generally involved the application of a continuous, hard, protective coating to the soft substrate. In one method, a resin coating is applied to the substrate and then cured or hardened in place. Although this technique can be applied to many plastic surfaces, the cured resin coating itself may not have a significantly higher degree of scratch resistance than the underlying plastic substrate. Even when the cured resin does impart a degree of scratch resistance, the cured resin may not adhere strongly to the substrate. In such cases, especially where the product is subject to flexing action or temperature variations, the bond between the cured protective resin and the substrate is prone to failure.

Vacuum deposition techniques have also been used to form protective coatings in the form of dense hard films on substrate surfaces. The hard films produced generally lack flexibility and are, therefore, subject to cracking or "crazing" due to either temperature changes or flexing motions in the product. Furthermore, vacuum deposition techniques do not easily lend themselves to coating many plastic substrates due to the elevated temperatures normally required and the long exposure to the temperatures necessary to form the protective coating. The technique, which is relatively expensive and time consuming, is generally limited to more expensive and higher value added products.

Diamond (the hardest naturally occurring material known) and other similarly hard materials have not been used as films or coatings on relatively soft materials such as plastic to provide scratch resistance or improved wear characteristics. Even if such films could be prepared, they would be extremely expensive and would be subject to similar "crazing" effects as the hard resin coatings of the prior art.

It is desirable, therefore, to provide new protective surfaces or coatings for plastic, glass, metal, and composite materials which provide a high degree of scratch resistance and improved wear characteristics. It is also desirable to provide plastic articles with a degree of scratch resistance heretofore unobtainable. It is also desirable to provide new protective surfaces or coatings which are not prone to "crazing" effects normally associated with continuous protective films. It is also desirable to provide new protective surfaces or coatings which can be easily formed at a relatively low cost on a wide variety of substrate materials and on a wide variety of shaped products. It is also desirable to provide transparent scratch resistance surfaces or coatings. The present invention provides such methods and products.

SUMMARY OF THE INVENTION

In accordance with this invention, a method is provided whereby substrates or articles with improved scratch resistance can be prepared. More specifically, a method is provided whereby plastic, polymer, glass, metal, or composite substrates or articles with improved scratch resistance can be prepared. This invention is also related to substrates and articles having discrete, hard particles embedded within and bonded to the surface layer of the substrate or article, whereby the scratch resistance of the substrate or article is significantly improved without a significant increase in the weight or external dimensions of the substrate or article. The scratch resistant articles of the present invention are not prone to "crazing" like many of the prior art scratch resistant coatings. Since the hard particles are embedded within the surface layer as individual, discrete particles (rather than as a continuous film), the particles can move independently of each other with temperature changes and flexing of the substrate. Temperature changes and flexing of the substrate do not, therefore, affect or diminish the scratch resistance nature of the protective surfaces or coatings of this invention.

The present invention involves the application of a thin layer or coating of discrete particles of a hard material to the surface of a relatively softer substrate. Preferably (especially for particles below about 1 micron) the discrete particles are applied to the substrate surface in the form of a colloidal or sol suspension in a suitable liquid. The substrate is then softened sufficiently to allow the discrete particles to become embedded within and bonded to the surface layer of the substrate. Once the substrate rehardens, the embedded particles are retained within the surface layer, thereby forming a new surface material which imparts scratch resistance to the substrate. The scratch resistance of the surface layer can approach that of the embedded particles without significantly increasing the weight of the substrate or significantly modifying other non-wear related properties of the substrate.

One object of the present invention is to provide a method for improving the surface wear characteristics of a substrate, said method comprising the steps of:

(1) applying a coating of discrete, hard particles on the surface of the substrate;

(2) softening the surface layer of the substrate;

(3) embedding the discrete, hard particles within the softened surface layer of the substrate; and (4) allowing the surface layer of the substrate to reharden; wherein the discrete, hard particles are embedded within and bonded to the surface layer of the substrate and wherein at least a significant proportion of the embedded discrete, hard particles are partially exposed on the surface of the substrate, whereby the surface wear characteristics of the substrate are improved. Preferably the substrate is plastic and the hard material is selected from the group consisting of diamond, silicon dioxide, aluminum oxide, cubic boron nitride, boron carbide, silicon carbide, silicon nitride, tantalum carbide, titanium carbide, titanium nitride, tungsten carbide, and zirconia alloys. Preferred zirconia alloys have at least one phase stabilization additive selected from the group consisting of yttrium, hafnium, calcium, magnesium, and cesium.

Another object of the present invention is to provide an article with improved scratch resistance, said article having discrete particles of a hard material selected from the group consisting of diamond, silicon dioxide, aluminum oxide, cubic boron nitride, boron carbide, silicon carbide, silicon nitride, tantalum carbide, titanium carbide, titanium nitride, tungsten carbide, and zirconia alloys having at least one phase stabilization additive selected from the group consisting of yttrium, hafnium, calcium, magnesium, and cesium within and bonded to the surface layer of the article and at least partially exposed on the surface of the article, wherein the embedded discrete particles provide improved scratch resistance to the surface of the article. Preferably the article is plastic or glass and the hard material is diamond.

These and other objects and advantages of the present invention will become apparent through the following description of the preferred embodiments of the invention and with reference to the drawings provided.

The present invention is not to be limited to the details of construction and arrangement of parts as illustrated in the accompanying drawings as the invention is capable of other embodiments and of being practiced in various ways within the scope of the appended claims. Furthermore, the terminology used in this present specification is for the purpose of description and not of limitation.

DESCRIPTION OF THE PREFERRED EMBODIMENTS

Figure 1:
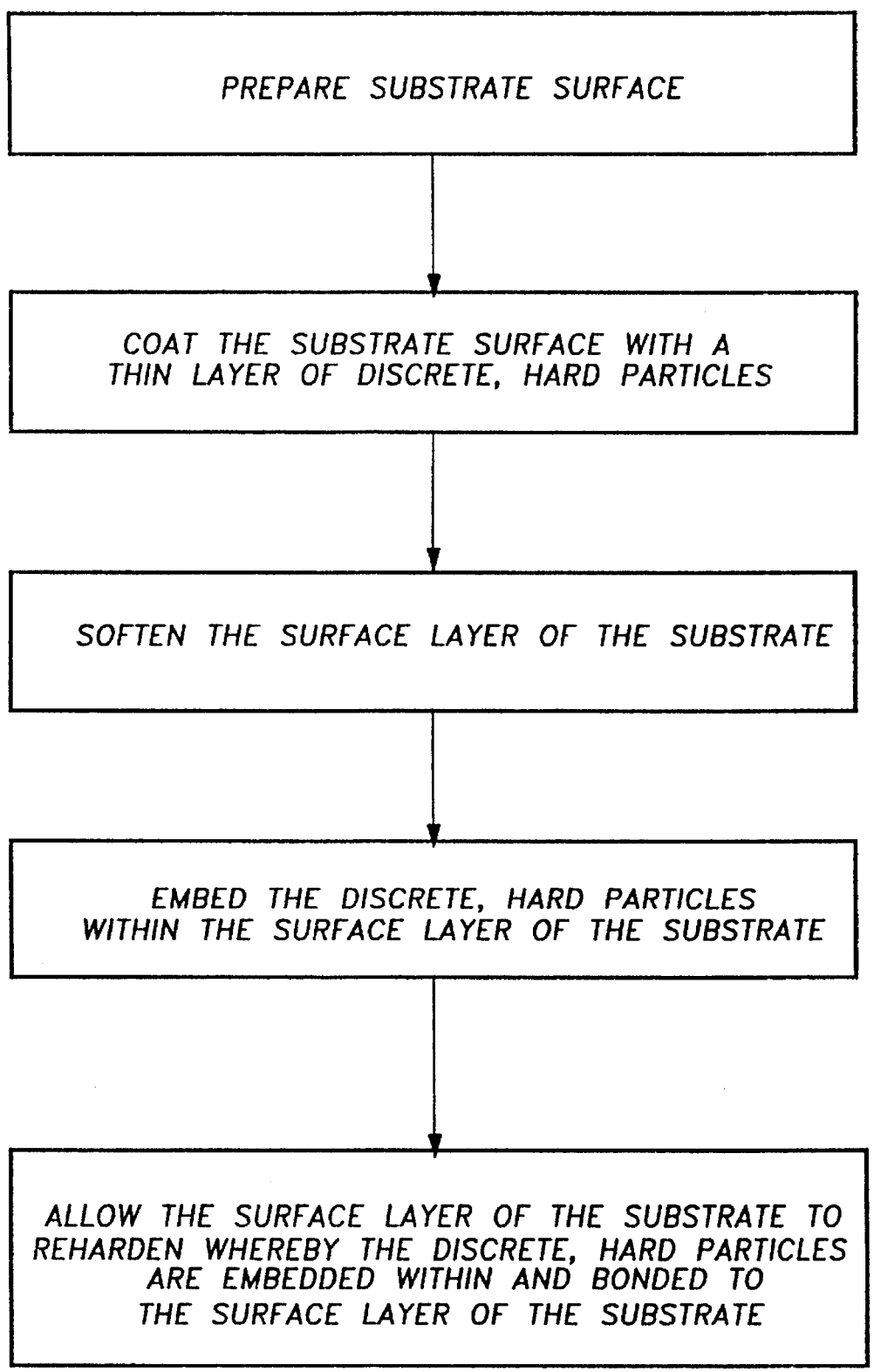
FIG. 1 is a flowchart illustrating the general method of this invention.
Figure 2:
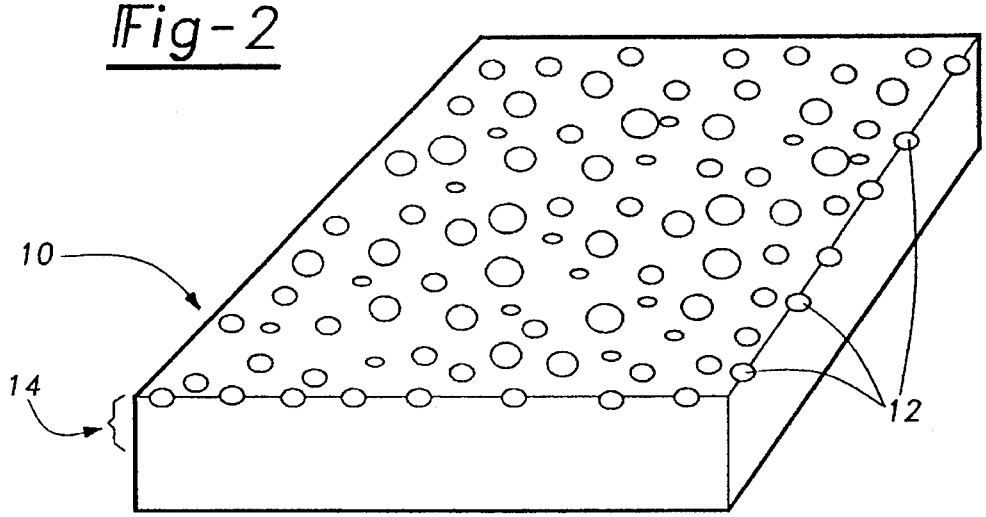
FIG. 2 is a perspective view of an substrate produced by the method of this invention having embedded particles within the surface layer of the substrate.
Figure 3:
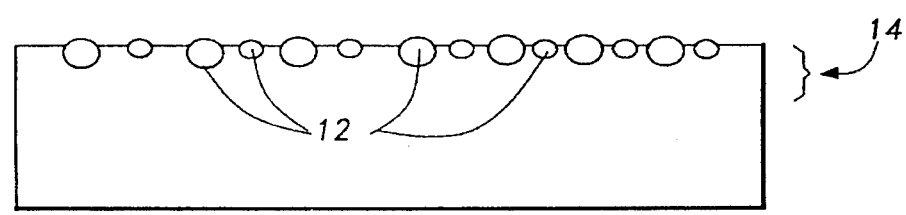
FIG. 3 is a sectional view of an substrate produced by the method of this invention having embedded particles within the surface layer of the substrate.

This invention relates to a method of preparing scratch resistant substrates or articles and the scratch resistant substrates or articles produced therefrom. The method of this invention is generally illustrated in FIG. 1. This method requires application of a thin layer or coating of discrete, hard particles. Preferably, the thin layer of discrete, hard particles is applied using a colloid or sol containing the discrete, hard particles. The surface layer of the substrate is then softened sufficiently so that the discrete, hard particles can be forced into or embedded within the surface layer. It is generally preferred that the substrate surface layer is softened after the hard particles have been deposited on the surface as shown in FIG. 1. The surface can be softened before the application of the hard particles if desired; in some instances, this may be the preferred procedure. After the hard particles are applied to the substrate surface and the substrate surface has been softened to the necessary degree, the discrete, hard particles are embedded within the surface layer of the substrate. It is generally preferred that pressure is used to effect the embedment of the discrete, hard particles into the surface layer of the substrate. After the discrete, hard particles have been embedded with the surface layer, the surface layer is allowed to reharden whereby the hard particles remain embedded within and become bonded to the surface layer of the substrate. It is generally preferred that the substrate surface is prepared or treated prior to the coating or application of the discrete, hard particles in order to enhance the adhesion of the discrete, hard particles within the surface layer in the final product. The embedded discrete, hard particles provide the desired scratch resistance to the substrate or article.

FIGS. 2, 3, 4A, and 4B illustrate the discrete, hard particles 12 embedded within and bonded to the surface layer 14 of the substrate 10. The hard particles 12 are generally embedded in the surface layer 14 in a random, non-ordered arrangement. To insure uniform scratch resistance, however, the distribution of the hard particles 12 embedded within the surface layer 14 should be relatively uniform across the surface to be rendered scratch resistant. In some cases, it may be desirable or even preferred that an ordered arrangement of the hard particles 12 within the surface layer 14 be used. The hard particles 12 are embedded in the surface layer 14 such that at least a portion of the individual hard particles 12 are exposed on the exterior surface of the substrate. Thus, as can be seen in FIGS. 2, 3, 4A, and 4B, the exterior surface of the substrate or article consists of the exposed portion of the hard particles 12 and the exposed surface layer 14. And as can also be seen from these same Figures, the individual particles 12 remain discrete within the surface layer and are separated from each other by the substrate material. Some particles may contact neighboring particles without adversely affecting the properties of the resulting article. Thus, in effect, the exposed portions of the hard particles 12 are "floating like independent islands in a sea" of substrate material. This separation of the individual hard particles helps to prevent the "crazing" (i.e., cracking) normally associated with continuous scratch resistant coatings of the prior art. The relative amount of exposure can be controlled by varying the amount of hard particles embedded within the surface layer, the degree of softening of the surface layer, and the pressure used to embed the hard particles. The scratch resistance of the resulting article will generally increase as the relative amount of hard particles exposed on the surface of the substrate increases. A significant proportion of the embedded, hard particles must be partially exposed on the substrate surface. By "significant proportion" it is meant that at least 5 percent of the scratch resistant surface area is formed by the exposed particles. It is generally preferred that the surface area of the exposed portion of the individual hard particles 12 makes up at least 50 percent, more preferably at least 75 percent, and even more preferably at least 90 percent of the exterior surface area on those areas that are desired to be scratch resistant.

Figure 4A:
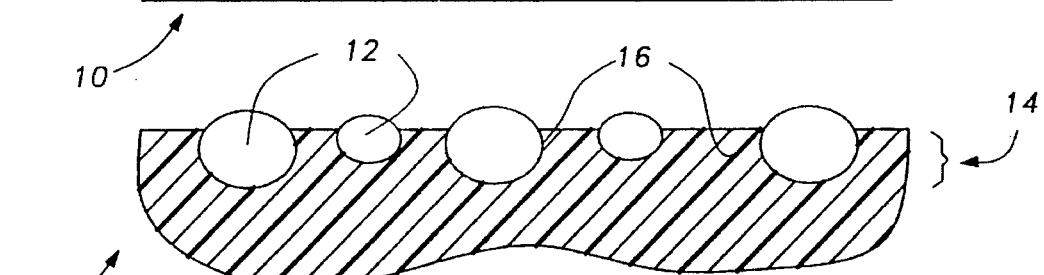
FIGS. 4A and 4B are sectional views of substrate produced by the method of this invention having particles embedded to different degrees within the surface layers of the substrates.
Figure 4B:
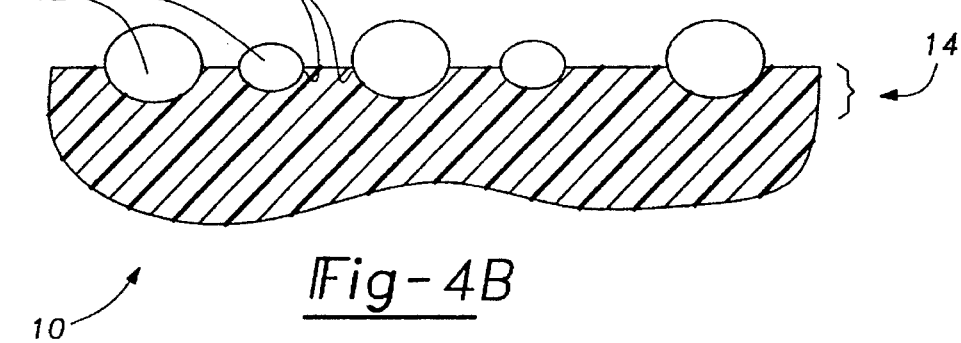

As illustrated in FIGS. 2, 3, 4A, and 4B, it is generally preferred that the surface layer 14 of the substrate contain essentially one layer of hard particles 12 where at least a portion of the individualized hard particles are exposed on the exterior surface of the substrate. So long as there are sufficient hard particles 12 exposed on the exterior surface (i.e., an amount sufficient to achieve the desired scratch resistance), there may be other hard particles completely embedded within the surface layer 14, including hard particles buried completely below the first layer of hard particles which are exposed on the surface of the substrate. Such completely embedded hard particles, while not contributing significantly to the scratch resistance of the substrate, may significantly improve the overall strength and other wear characteristics of the substrate. It is generally preferred that at least 50 percent of the volume of the individual hard particles is contained within the surface layer as illustrated in FIG. 4B. It is more preferred that at least 75 percent of the volume of the individual hard particles is contained within the surface layer as illustrated in FIG. 4A.

As shown in FIG. 4A, the substrate material 16 within the surface layer 14 helps to physically retain or hold the hard particles 12 within the surface layer 14. In addition to the physical forces holding the hard particles 12 within the surface layer 14, the hard particles may chemically bond to the substrate material as well. Such chemically bonding will depend to a large extent on the particular substrate and hard particle used. To increase chemical bonding between the substrate and the hard particles, the hard particles can be coated with a primer or coupling agent capable of bonding to or reacting with both the hard particles and the substrate or treated to increase surface adhesion. The primer, which can be a solid or liquid, should generally be applied to the hard particles prior to embedding the hard particles within the substrate. It is generally preferred that the minimum amount of primer necessary is used; generally about a monolayer of the primer on the hard particles should be appropriate although in specific applications smaller or larger amounts may be used. Suitable primers or treatments include organofunctional silanes, titanyls, zirconyls, metallo-organics, metal alkoxides, metal esters, metal carboxylates, metallic salts, anionic compounds, Lewis acid or Lewis base treatments, gas-phase treatments with steam, sulfur dioxide, ethylene oxide, chlorine, or oxygen, and the like. The specific primer used will depend in large part on the particular hard particles and substrate used. The hard particles may also be coated, if desired, with colorants or dyes to provide coloration of the surface layer. Such colorants or dyes may be especially useful with submicron hard particles and transparent substrates (e.g., tinted scratch resistant plastic eyeglass lenses).

Figure 5:
FIGS. 5 and 6 are scanning electron micrographs (about 7 μm field) of the surface of a polymethylmethacrylate substrate treated in accordance to the present invention. A colloidal suspension of diamond particles (about 0.1 to 0.3 μm) were applied to the surface and then embedded therein using heat and a conventional rolling mill.
Figure 6:

FIGS. 5 and 6 are scanning electron micrographs (about 7 μm field) of the surface of a polymethylmethacrylate substrate treated in accordance to the present invention. A colloidal suspension of diamond particles (about 0.1 to 0.3 μm in diameter) was applied to the surface and then embedded therein using a conventional hot rolling mill. The hardened surface, having been embedded with diamond particles, is shown. Larger agglomerations of diamond particles can be seen as lighter areas.

The adhesion of the discrete, hard particles within the surface layer can also be enhanced by treatment of the substrate surface prior to the application of the discrete, hard particles to the substrate surface. This surface treatment can also be used to prepare the substrate surface so that the discrete, hard particles will better adhere to the substrate surface while and until they are embedded within the surface layer. This optional, but preferred, step is shown as the first step in FIG. 1. Any surface treatment method which will increase the initial or ultimate adhesion of hard particles to the substrate material can be used. As those skilled in the art will realize, the actual method used will depend in large part on the composition of the substrate and the hard particles. Generally, such methods will include treatment with organofunctional silanes, titanyls, zirconyls, metallo-organics, metal alkoxides, metal esters, metal carboxylates, metallic salts, anionic compounds, Lewis acids or Lewis bases, and gas-phase treatments with steam, sulfur dioxide, ethylene oxide, chlorine, or oxygen, and the like. The treatment duration should be sufficient to achieve the desired result.

In general, the hardness of the discrete, hard particles should be greater, and preferably significantly greater, than the hardness of the substrate. It is generally preferred that the hard particles be at least as hard as silicon dioxide. Suitable and preferred hard particles include diamond particles, silicon dioxide particles, aluminum oxide particles, cubic boron nitride particles, boron carbide particles, titanium nitride particles, silicon carbide particles, silicon nitride particles, tantalum carbide particles, titanium carbide particles, tungsten carbide particles, titanium nitride particles, and zirconia alloy particles. Preferred zirconia alloy particles have at least one phase stabilization additive selected from the group consisting of yttrium, hafnium, calcium, magnesium, and cesium. If desired, mixtures of these particles can be used. More preferred hard particles include diamond, cubic boron nitride, silicon carbide, silicon nitride, titanium nitride, and tungsten carbide. The most preferred hard particles for use in this invention are diamond particles. It is generally preferred that the particle size of the hard particles is less than about 200 microns. Particle sizes of less than about 100 microns are more preferred. In some applications even smaller particles sizes (for example, less than 50 or even 10 microns) will be preferred. Submicron particles are especially preferred where optical clarity of the resulting scratch resistant substrate is important; such submicron particles could be used, for example, in the production of scratch resistant plastic or glass windows or plastic or glass electronic display screens. The actual shape of the discrete, hard particles does not appear to be especially important. The discrete, hard particles can be irregular or regular shaped. In some applications, regular shaped (e.g., spherical or octahedral shaped) particles may be preferred. Such regular shaped particles may allow for more uniform distribution of the particles within the surface layer or may allow for controlled orientation of the particles within the surface layer.

The substrate to be treated must be softer than the hard particle used. The substrate must also be capable of being softened to allow embedment of the hard particles within the surface layer. Suitable substrates include plastics (especially thermoplastics), polymers, glasses, relatively soft metals, and composites. Suitable plastics include thermoplastics such as acrylics, polyacetals, chlorinated polyethers, fluoroplastics, ionomers, polyamides, polycarbonates, polyolefins, polystyrene, polysulfones, and the like. Plastics which are especially preferred in the practice of this invention include acrylic resins such as polymethylmethacrylate (e.g., Plexiglas™ or Lucite™) and polycarbonates (e.g., Lexan™m). Thermosetting plastics (including alkyds, epoxide resins, phenolic resins, polyesters, and the like) can also be used in the process of this invention. Suitable glasses include standard glasses (e.g., soda-lime glass) as well as specialty glasses (e,g., borosilicate glass and the like). Suitable metals include the relatively soft metals such as aluminum, tin, copper, lead, brass, and the like. Suitable composites include, for example, glass-filled plastics, reinforced plastics, and the like.

In order to embed the hard particles within the surface layer of the substrate it is necessary to "soften" the surface layer. The softening step can take place either before or after (or even as) the hard particles are coated on the substrate. Although any means of softening the substrate surface can be used, it is generally preferred that the following techniques are employed: thermal or chemical means with thermoplastic substrates; chemical means with thermosetting plastic substrates; and thermal means with glass and metal substrates. Thermal softening can be affected by conventional techniques such as a convection oven, microwave oven, hot rollers, and the like. Thermal softening can also be affected by less conventional techniques such as lasers or ion bombardment. The actual temperature necessary to affect softening of the substrate will, of course, depend on the substrate to be treated. For thermoplastic substrates it will generally be preferred to heat the substrate near or slightly above its glass transition temperature to affect the necessary softening. For some thermoplastic materials which tend to yellow at elevated temperatures, chemical softening techniques may be preferred, especially if transparency or optical clarity is important. As one skilled in the art will realize, a much higher temperature will be required to soften glass or metal as compared to the thermoplastics. In some instances it may be preferred to treat a particular substrate by the method of this invention at the time the substrate is first formed. For example, it may be preferred to embed hard particles within a glass substrate as the glass is cooling (but still "soft") from the molten state rather than to reheat the cooled glass at some later time.

Chemically softening can be affected by exposure of the substrate surface to the vapor or liquid of a chemical that will soften the substrate. For example, many plastics can be softened by exposure to various organic solvents, especially at elevated temperatures. Suitable solvents for softening plastics might include acetone, alcohols, chlorinated hydrocarbons, methyl ethyl ketone, methyl iso-butyl ketone, toluene, and the like. Mixtures of solvents may be used if desired. The particular solvent used will, of course, depend on the actual plastic material to be treated.

Coating the hard particles on the substrate surfaces can be effected using conventional techniques such as, for example, dipping, brushing, spraying, transfer plate techniques, and the like. The hard particles can be applied in dry form or using a vehicle or carrier. The hard particles, which should be insoluble in the carrier, can be applied using suspensions or dispersions. Suitable suspensions would normally contain about 5 to 15 weight percent of the hard particles in a suitable carrier although higher or lower percentages can be used. Both aqueous and non-aqueous carriers can be used. The use of such vehicles or carriers allows the hard particles to be easily coated with various additives, primers, or coupling agents as desired. Such additives could include, for example, UV stabilizers, antioxidants, and the like. With very small particles (generally below about 1 micron) and especially with submicron particles, a colloidal mixture or sol is preferred. For example, for submicron diamond particles, a colloidal mixture of the diamond particles formed with water and polymethylmethacrylate is preferred. When a carrier is used to apply the hard particles, it is generally preferred that the carrier is allowed to evaporate or is otherwise removed from the substrate surface prior to embedding the hard particles within the surface layer of the substrate. Coating the dry particles could be undertaken using transfer plate techniques where the particles are applied to a suitable transfer plate and then pressing the plate onto the surface of the softened substrate to be treated. As one skilled in the art will realize, transfer plate techniques can be employed to advantage in combination with injection molding or gas-assisted injection molding techniques. The hard particles could be deposited onto the appropriate surfaces within a mold cavity. Injecting molten plastic into the cavity will embed the hard particles as the same time as the article is molded.

It is generally preferred that only the substrate surface is softened so as to prevent the hard particles from being embedded too deep in the substrate during subsequent steps and to prevent thermal distortion of the substrate article. As those skilled in the art will realize, such localized softening can be carried out in many ways. For example, with thermal heating and sheet-like substrates, localized heating can be carried out using a hot roller on the surface to be treated and a chilled roller on the surface not to be treated. The localized softening can also be controlled by the speed of the substrate through the rollers (especially where both planar surfaces of the sheet-like substrate are to be heated and both rollers are heated). Where it is not possible to avoid significant softening of the interior portions of the treated article, physical restraints (i.e., a mold cavity) can be used to contain the article during the processing to avoid physical distortion.

Once the hard particles are coated on the substrate surface and the substrate surface is sufficiently softened, the hard particles are embedded within the substrate surface to the desired depth. If the substrate is sufficiently softened, the hard particles' weight may be sufficient to embed the particles within the surface layer. Generally, however, it is preferred to use pressure to embed the particles within the surface layer. Such pressure can be applied by conventional presses or, more preferably, by pressure rollers. If desired, the actual softening of the substrate surface and the embedment of the hard particles within the substrate surface can occur at essentially the same time. For example, hot rollers can be used to soften the substrate surface and embed the hard particles during a single pass through the rollers. The applied pressure should be sufficient to embed the hard particles to the desired depth but less than that required to crush the hard particles. As those skilled in the art will realize, the degree of softening of the surface and the required pressure are interrelated variables. For softer surface layers, less pressure will be required. As the degree of softening decreases, more pressure will generally be required. The appropriate level of softening and pressure (which in most cases will vary over a relatively wide range) can be determined by routine experimentation for particular substrate/hard particle combinations.

Once the hard particles are embedded within the surface layer of the substrate, the substrate is allowed to reharden. If the substrate was softened thermally, the temperature of the substrate can be allowed to equilibrate with ambient temperature. The cooling rates can be increased, if desired, by providing heat transfer elements to remove the heat from the article. If the substrate was softened chemically, the softening chemicals can be allowed to evaporate naturally. The evaporation rates can be increased, if desired, by applying air or inert gas streams or by applying a vacuum to the substrate surface with or without added heat. Once the substrate surface has rehardened, the hard particles should be embedded within and bonded to the surface layer material. If desired, the scratch resistant surface of the final product can be polished or buffed to obtain a finished appearance. Such polishing can also be used to expose the desired amount of hard particles on the surface by removing surface substrate material.

The articles produced by the practice of this invention have improved scratch resistance and improved wear characteristics. These improvements are achieved with no significant increase in the weight or overall dimensions of the treated substrate. Products that can be treated by the practice of this invention include, without limitation, injection molded or vacuum formed parts, sheet plastic, plastic and glass window materials, counter tops, electronic display screens, decorative moldings, automotive parts and components, optical lenses, and the like. As noted above, the use of submicron hard particles allows the formation of scratch resistant and optically clear components. Thus, the present invention is especially useful in the manufacture of scratch resistant and transparent plastic and glass articles for use as windows, lenses, automotive headlights and taillights, optical components, viewing screens (i.e., computer or television screens and conventional or microwave oven windows) and like articles. As those skilled in the art will realize, the articles produced by this invention will be useful and offer significant advantages in many commercial, consumer, military, and other products and applications.

The following examples are provided to illustrate the invention and not to limit the invention.

EXAMPLE 1

This examples illustrates the preparation of a scratch resistant polymethylmethacrylate substrate using diamond powder. Stock solution A was prepared by dissolving 14.35 ml of methacryloxyproplytrymethoxy silane (Petrarch Systems Inc., Bristol, Pa.) in 18.95 ml methanol, 0.15 ml glacial acetic acid, and 0.75 ml deionized water. Treatment solution B was prepared by adding 1.70 ml of stock solution A to 40 ml methanol. Ten (10) grams of diamond powder (300 Series, 0 to 0.5 μm, General Electric, Worthington, Ohio) was added to treatment solution B with stirring. Stirring was continued for 1 hour. The diamond-containing solution was centrifuged to separate the diamond powder. The diamond powder was washed four times with methanol with separation by centrifuging (7 minutes at 12,000 rpm) after each washing. The diamond powder was then suspended in about 38 ml of methanol and then centrifuged (4 minutes at 5,000 rpm). The diamond powder was collected by decanting the methanol. The coating solution C was prepared by adding 102 ml of methanol and 0.2 g of 2-methylpropionitrile (Kodak) to the collected diamond powder.

The polymethylmethacrylate substrate (about 2 by 4 inches by 1/16 inches thick; Panelview, Inc., Hillsboro, Oreg.) was soaked in 0.1M aqueous solution of $NH_4OH$ for 16 hours. After removing from the treatment bath, the substrate was rinsed with deionized water and allowed to air dry. The treated substrate was immersed in coating solution C for four hours while $N_2$ was bubbled through the solution to keep the diamond powder in suspension and allow continuous contact with the substrate surface. After treatment, the substrate was removed and rinsed with deionized water.

The diamond-coated substrate was heated in a 600 watt microwave oven at for two minutes. The resulting surface temperature was higher than the melting point of the substrate. The diamond particles were embedded in the surface layer of the substrate by one passage through an "Altors" rolling mill.

The resulting article had diamond particles embedded in the surface such that over 90 percent of the substrate surface consisted of diamond particles. The resulting article had excellent scratch resistance. Steel wool rubbed against the surface did not significantly scratch or mar the surface.

EXAMPLE 2

A scratch resistant polymethylmethacrylate substrate with embedded diamond powder was prepared in essentially the same manner and using essentially the same materials as in Example 1. Using the same stock solution A as Example 1, treatment solution B was prepared by adding 1.70 ml of stock solution A to 40 ml methanol. Ten (10) grams of the same diamond powder of Example 1 was added to treatment solution B with stirring. Stirring was continued for 1 hour. The diamond-containing solution was centrifuged to separate the diamond powder. The diamond powder was washed four times with methanol with separation by centrifuging (7 minutes at 12,000 rpm) after each washing. The diamond powder was then suspended in about 38 ml of methanol and then centrifuged (4 minutes at 5,000 rpm). The diamond powder was collected by decanting the methanol. The coating solution C was prepared by adding 102 ml of methanol and 0.422 g of benzoyl peroxide (70% wet; Aldrich) to the collected diamond powder.

The polymethylmethacrylate substrate (about 2 by 4 inches by 1/16 inches thick; Panelview, Inc., Hillsboro, Oreg.) was soaked in 0.1M aqueous solution of $NH_4OH$ for 16 hours. After removing from the treatment bath, the substrate was rinsed with deionized water and allowed to air dry. The treated substrate was immersed in coating solution C for four hours while $N_2$ was bubbled through the solution to keep the diamond powder in suspension and allow continuous contact with the substrate surface. After treatment, the substrate was removed and rinsed with deionized water.

The diamond particles were embedded in the surface layer of the substrate by one pass of a hot sealing iron. The temperature of the iron was estimated at about 250° C.

The resulting article had diamond particles embedded in the surface such that over 90 percent of the substrate surface consisted of diamond particles. The resulting article had excellent scratch resistance. Steel wool rubbed against the surface did not significantly scratch or mar the surface.

That which is claimed is:

1. An article with improved scratch resistance, said article having discrete particles of a hard material selected from the group consisting of diamond, silicon dioxide, aluminum oxide, cubic boron nitride, boron carbide, silicon carbide, silicon nitride, tantalum carbide, titanium carbide, titanium nitride, tungsten carbide, and zirconia alloys, wherein said discrete particles are embedded within and bonded to the surface layer of the article and at least partially exposed on the surface of the article, wherein the embedded discrete particles provide improved scratch resistance to the surface of the article and wherein the article is produced by the steps of coating the surface of the article with discrete particles of the hard material; softening the surface layer of the article;

embedding the discrete particles of the hard material within the softened surface layer of the article; and allowing the surface layer of the article to reharden, wherein the discrete particles of the hard material are embedded within and bonded to the surface layer of the article and at least partially exposed on the surface of the article.

2. An article as defined in claim 1, wherein the article is plastic, polymer, glass, metal, or composite.

3. An article as defined in claim 1, wherein a colloidal or sol suspension of the discrete particles is used to coat the surface of the substrate.

4. An article as defined in claim 1, wherein the surface layer of the article is softened thermally.

5. An article as defined in claim 1, wherein the surface layer of the article is softened by exposure to a solvent.

6. An article as defined in claim 4, wherein the hard particles are embedded in the softened article surface under the effect of pressure.

7. An article as defined in claim 5, wherein the hard particles are embedded in the softened article surface under the effect of pressure.

8. An article as defined in claim 6, wherein the article is optically clear.

9. An article as defined in claim 7, wherein the article is optically clear.

* * * * *